May 26, 1959 K. REPPERT 2,888,036
BUTTERFLY VALVE WITH SEALING RING MOVABLY
MOUNTED FOR ACCOMMODATION TO SEAT
Filed Oct. 26, 1954 3 Sheets-Sheet 2
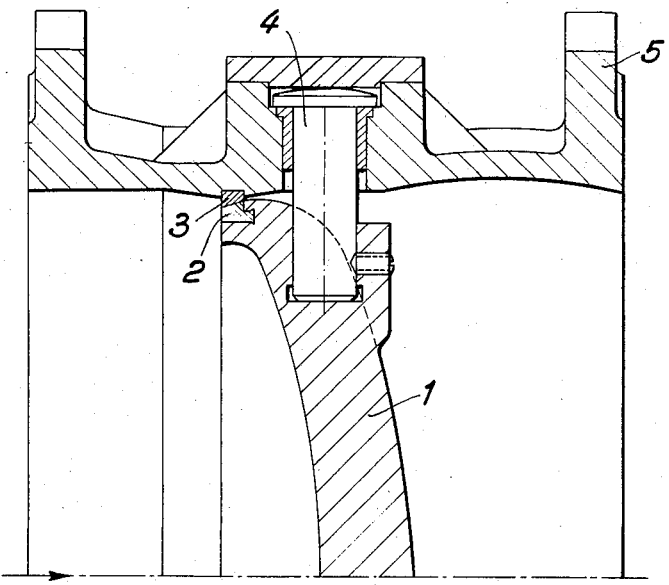
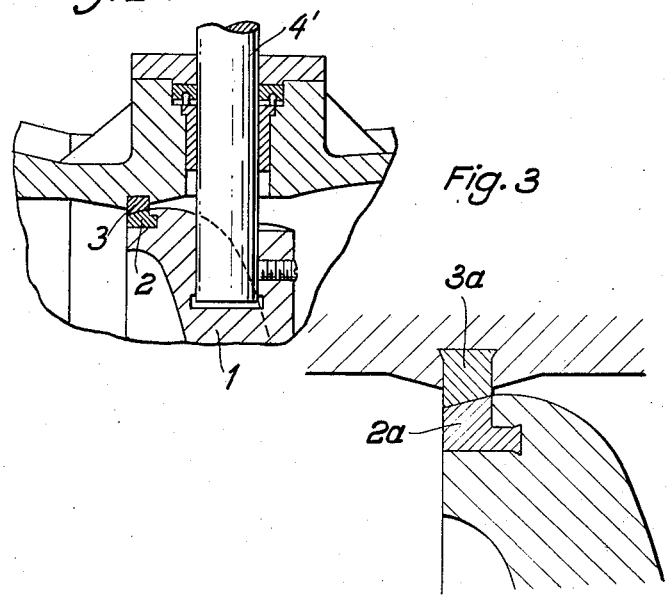
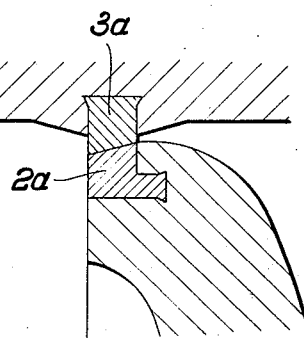
Inventor:
Karl Reppert

United States Patent Office 2,888,036
Patented May 26, 1959

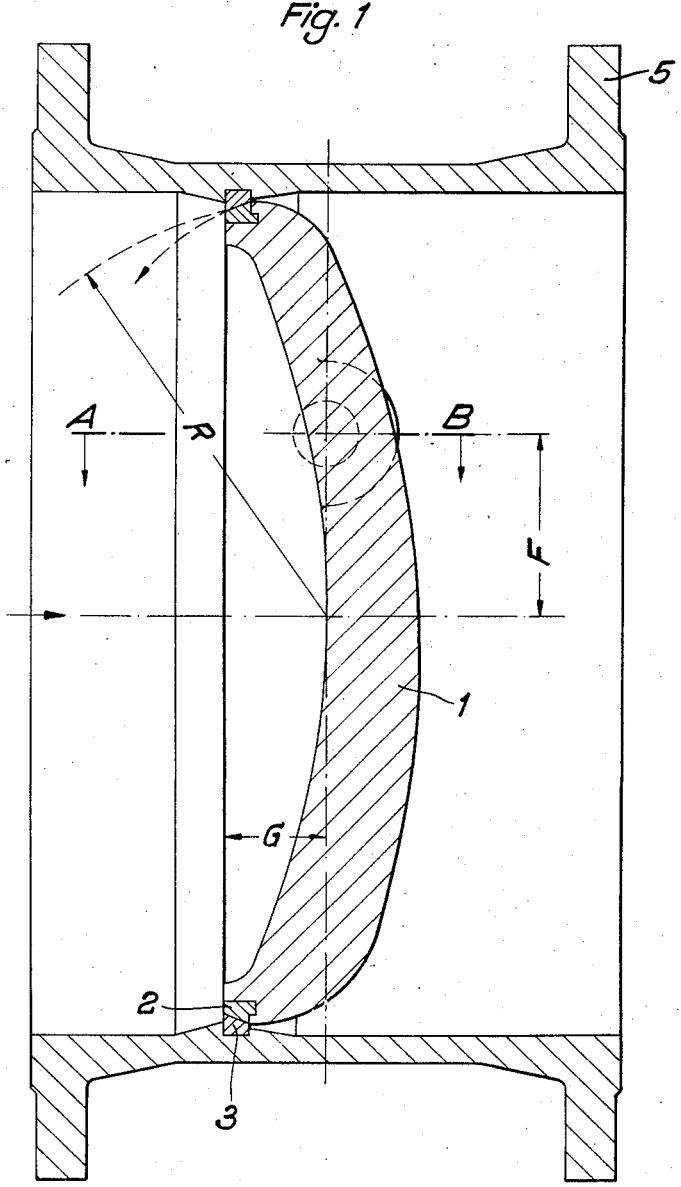

2,888,036

BUTTERFLY VALVE WITH SEALING RING MOVABLY MOUNTED FOR ACCOMMODATION TO SEAT

Karl Reppert, Heidenheim (Brenz), Germany, assignor to Firma Johannes Erhard, Heidenheim (Brenz), Germany, a corporation of Germany Application October 26, 1954, Serial No. 464,868

Claims priority, application Germany December 15, 1953

2 Claims. (Cl. 137—527.4)

The present invention relates to butterfly valves for controlling fluids in pipe lines, in general, and to such valves which upon shutting off the pipe lines do not permit a return of the medium.

The known butterfly throttle valves, in which the rotating axis of the flap is disposed outside the cross-section of the area of the flowing medium, have a comparatively large casing of a length of more than double the width of the valve opening, the opening of which casing, through which the flap is inserted during its assembly, is closed by means of a cover. The flap is rotatably mounted by means of a bolt and lever on the flap shaft disposed in the opening. The rotating axis of the shaft and the form of the lever are chosen and disposed in such manner that the flap tends to assume its closed position. Due to the flow of the medium the flap opens up for a predetermined angle and, upon stopping the flow, the flap is closed due to its tendency to assume its closed position and also due to the return flow of the medium. In opening the flap performs a swinging movement, whereby the swinging stroke increases with the increasing length of the lever arm between the center of the flap and the rotating axis of the flap shaft. During the closing of the flap the latter hits the sealing ring with a severe blow due to its closing tendency and the returning water flow. Depending upon the operating pressure and the width of the opening these blows may bring about destructive consequences. Furthermore, this construction of butterfly valves leads to a high pressure loss.

It is, therefore, one object of the present invention, to provide a structure for butterfly valves in which the socket for the bearing of the flap is disposed within the upper half of the flap and in particular set off forwardly out of the plane of the sealing rings in the normal direction of the flow of the medium, whereby advantageously the socket of the bearing for the flap is disposed off-center of the area of the flow of the medium relative to the axis of the pipe line.

It is still another object of the present invention to provide a structure for butterfly valves, which brings about a saving on weight, simplified working, a more favorable static stress and improved flowing conditions, whereby the casing for the flap may be formed of a simple pipe which is of greater width than length.

It is yet another object of the present invention to provide a structure for butterfly valves, the flap of which is designed and supported in such manner that its center of gravity is disposed outside the rotating axis of the flap, thereby achieving the tendency to assume the closing position.

It is a further object of the present invention to provide a structure for butterfly valves in which the opening and the position of the flap at a predetermined angle is brought about in a manner similar to that of the known flaps, while, however, the abutment of the flap on the sealing ring is softer, since not the entire energy composed of the closing tendency of the flap and of the pressure from the returning water flow is exerted; whereby the returning water flow produces a moment of inertia on one side of the rotating axis in a direction opposite to that produced on the other side of the rotating axis, so that there results always during the closing movement of the flap a difference as resultant moment of inertia, with an appreciable saving of the construction parts.

It is a still further object of the present invention to provide a structure for butterfly valves in which the sealing faces between the flap and the sealing ring are selectively spherical or conical and in which the sealing ring is set in solidly into the flap if the prevailing pressure is not high and in which the sealing ring is mounted on the flap elastically and movably in axial direction if the prevailing pressure is higher, in order to provide the possibility for the sealing ring to follow any deformation of the sealing ring of the casing.

It is also another object of the present invention to provide a structure for butterfly valves in which a particular seating ring, carrying the sealing ring of the flap is yieldingly and sealproof mounted by means of two annular sealings disposed on oppositely disposed faces between a wall of the flap and a clamping ring permanently secured in the seating ring.

With these and other objects in view which will become apparent in the following detailed description, the present invention will be clearly understood in connection with the accompanying drawings, in which:

Figure 1 is an axial section through the flap designed in accordance with the present invention with the surrounding casing;

Fig. 2 is a section along the lines A—B of Fig. 1;

Fig. 2a is a section along the lines A—B of the Fig. 1, showing another embodiment of the pivot pins supporting the flap;

Fig. 3 is a fragmentary section through the sealing rings in closed position, the sealing ring of the flap being rigidly secured to the latter, and with conical sealing faces, at an enlarged scale;

Figure 4:
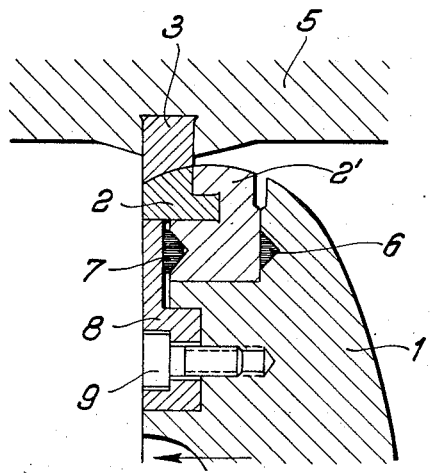
Fig. 4 is a similar fragmentary section with elastically mounted sealing ring of the flap and spherical sealing faces.

Referring now to the drawings and in particular to Figs. 1 and 2, the butterfly valve comprises a flap 1 with spherical sealing faces. A sealing ring 2 is inserted into the flap 1 and another sealing ring 3 is inserted into the casing 5. Both complementary sealing rings 2 and 3 are of metal or elastic material, so that both sealing rings bring about a tight sealing in the closed position by engagement of their sealing faces.

The flap 1 is supported by aligned pivot pins 4 mounted in the casing 5 within the upper half of the flap 1 and provided on a line spaced above the axis of the pipe line by the distance F (Fig. 1). In this manner the flap 1 assumes the tendency to take up its closed position and furthermore, in view of the axial offset G of the flap-pins 4 an interruption of the sealing ring 3 of the casing 5, as well as of the sealing ring 2 of the flap 1 is avoided. During the closing movement the upper moment of inertia directed to the right in Fig. 1 operates against the lower moment of inertia directed to the left in Fig. 1. By this arrangement the abutment of the flap 1 during closing on the sealing ring 3 of the casing 5 is appreciably softened or slowed down.

Referring now to Fig. 3, another embodiment is disclosed, in which the sealing ring 2a of the flap 1 and the sealing ring 3a of the casing 5 are equipped with conically shaped engaging surfaces. The structure of the butterfly valve in accordance with the present invention permits selectively the application of spherical or conical sealing faces, since no sliding movement of the respective sealing faces takes place during the opening and closing movement of the flap 1, rather an eccentric removal of the flap 1 is achieved due to the eccentric mounting of the flap 1.

Figure 5:
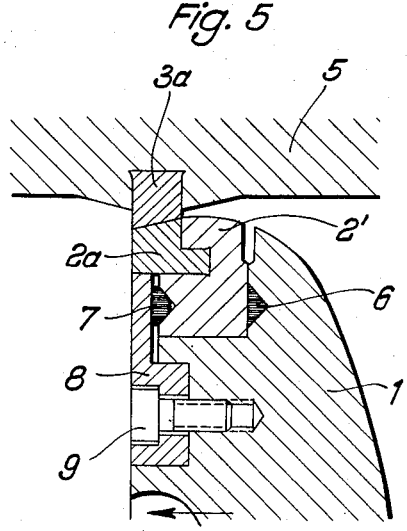
Fig. 5 is a similar fragmentary section with elastically mounted sealing ring of the flap and conical sealing faces.

Referring now to Figs. 4 and 5, which show applications of the present invention particularly designed for higher prevailing pressure, Fig. 4 discloses an embodiment with spherical sealing faces and Fig. 5 discloses an embodiment with conical sealing faces. If, due to prevailing high pressure, a radial expansion of the casing 5 with the sealing ring 3 takes place, the sealing ring 2 of the flap is pressed on the sealing ring 3 of the casing 5 in axial direction in the closed position of flap 1 due to the returning water movement. The annular sealing ring 6 prevents the flow of the returning medium and the annular sealing ring 7 serves as elastic bearing for the sealing ring 2 set in the seating ring 2', the clamping ring 8 being securely connected with the flap 1 by means of screws 9.

It is quite apparent that the embodiments shown in the drawings may be subjected to many constructive variations. Though the arrangement of two bearing pins 4 is preferable, it is also possible to provide a single bearing pin which runs through the flap 1. The dimensions of F and G which determine the position of the axis of the pin 4, may be varied to accommodate the same to the particular purpose for which the valve is used. Furthermore, the structure of the butterfly valve according to the present invention permits proper application thereof for pipe-breaks and closing valves.

Fig. 2 shows a pin 4 with a blind flange, by example for use as relief-valve, while Fig. 2a shows a pin 4' projecting through the armature, which may serve as base for a drive for controlled butterfly valves. The projecting part of the pin 4 may be used also to provide a load by means of a weight, of an oil-breaking device, etc.

While I have disclosed several embodiments of the present invention, it is to be understood that these embodiments are given by example only and not in a limiting sense, the scope of the present invention being determined by the objects and the claims.

I claim:

1. A butterfly valve for a pipe line comprising in combination a casing having a valve seat including a first seating rim and a flap having a second seating rim adapted to engage upon said seating rim of said casing, said seating rims comprising engaging sealing rings arranged on the said valve seat and the said flap, respectively, pivotal bearings supporting said flap in said casing, said pivotal bearings comprising at least one pin disposed within the upper half of said flap and forwardly from the plane of said sealing rings in engaged position in the direction of normal flow of the medium, the longitudinal axis of the said pin being disposed at a distance from the center of gravity of the said flap, and said center of gravity being substantially in the longitudinal axis of the said pipe line, the said flap being hollowed in the direction of flow of the said medium and the said pin passing sidewise the said uninterrupted sealing rings, a seating ring, said flap having a recess of a dimension in the flow direction greater than that of said seating ring, to provide play for said seating ring in the direction of flow, said flap receiving said seating ring in said recess, said sealing ring of the said flap being rigidly secured to said seating ring, means retaining said seating ring in said flap, and said seating ring moving together with said sealing ring of said flap axially relative to said flap.

2. The butterfly valve, as set forth in claim 1, said retaining means comprising a clamping ring mounted in the front face of the said flap, and a pair of additional annular sealing rings disposed oppositely each other on the respective front and rear faces of said seating ring between the front wall of the said flap parallel to the said faces and the rear wall of said clamping ring, in order to achieve a yielding and seal-proof mounting of the said seating ring in said flap.

References Cited in the file of this patent

UNITED STATES PATENTS

| | | |
|---|---|---|
| 1,721,114 | Hampton | July 16, 1929 |
| 1,744,798 | Price | Jan. 28, 1930 |
| 2,352,047 | Wahl | June 20, 1944 |
| 2,356,815 | Bischoff | Aug. 29, 1944 |
| 2,556,904 | Cline | June 12, 1951 |
| 2,669,419 | Young | Feb. 16, 1954 |
| 2,711,188 | Nickerson | June 21, 1955 |
| 2,791,396 | Reppert | May 7, 1957 |